US006991084B2

(12) United States Patent
Lunardi

(10) Patent No.: US 6,991,084 B2
(45) Date of Patent: Jan. 31, 2006

(54) HANDRAIL-DRIVE FOR ESCALATOR OR MOVING WALK

(75) Inventor: Gerhard Lunardi, Vienna (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 10/824,958

(22) Filed: Apr. 15, 2004

(65) Prior Publication Data

US 2004/0206603 A1 Oct. 21, 2004

(30) Foreign Application Priority Data

Apr. 17, 2003 (EP) .................................... 3405276

(51) Int. Cl.
*B65G 15/00* (2006.01)

(52) U.S. Cl. ........................ 198/335; 198/330; 198/337

(58) Field of Classification Search ................ 198/330, 198/334, 335, 337
See application file for complete search history.

(56) References Cited

U.S. PATENT DOCUMENTS 1,868,771 A * 7/1932 Shonnard .................... 198/337
2,211,427 A * 8/1940 Samuel ........................ 198/331
2,225,772 A * 12/1940 Dunlop ........................ 198/331
2,373,764 A 4/1945 Lautrup et al.
2,959,662 A * 11/1960 Crowley et al. ............ 219/212
3,688,889 A * 9/1972 Koch et al. ................. 198/337
4,232,776 A * 11/1980 Dean .......................... 198/322
4,240,537 A * 12/1980 Dunstan ..................... 198/334
5,125,494 A * 6/1992 Nurnberg et al. ........... 198/331
5,522,492 A * 6/1996 Spriggs et al. .............. 198/331
5,992,606 A * 11/1999 Pallinger et al. ............ 198/337
6,102,186 A * 8/2000 Pallinger et al. ............ 198/337
6,199,678 B1 * 3/2001 Reo ........................... 198/330
6,602,331 B2 * 8/2003 Gonzalez Alemany et al. . 96/66

FOREIGN PATENT DOCUMENTS

DE 198 37 914 A1 3/2000

* cited by examiner

*Primary Examiner*—Douglas Hess
(74) *Attorney, Agent, or Firm*—Schweitzer Cornman Gross & Bondell LLP

(57) ABSTRACT

In an escalator, a handrail is supported medially and reversed by means of a reversing sheave, which rotates about an axle which has approximately the width of a balustrade. The axle is held by at least one supporting cheek. A handrail-drive, which is integrated in the balustrade base, drives the reversing sheave by means of a drive-wheel, the handrail, which is guided over a diverter roller, being carried along by friction from the reversing sheave.

7 Claims, 6 Drawing Sheets

HANDRAIL-DRIVE FOR ESCALATOR OR MOVING WALK

The present invention relates to an escalator or a moving walk consisting of a balustrade, a balustrade base, steps or pallets for the transportation of persons and objects and, arranged on the balustrade, a handrail construction with a handrail for the safety of persons which, in a reversing zone of the balustrade, can be reversed by means of a drivable reversing sheave.

BACKGROUND OF THE INVENTION

From patent specification U.S. Pat. No. 2,373,764 an escalator has become known in which the handrail is guided over an upper reversing-wheel which drives the handrail and over a lower, free-running reversing-wheel. The upper reversing-wheel has a pulley which is coaxial with the reversing-wheel and drivable by means of a chain, the chain being drivable by means of a pulley of the step-chain reversing-wheel. The driving energy for the step-chain is provided by an electric motor and gearbox.

A disadvantage of such a device is that the handrail-drive can only be used with encapsulated or enclosed reversing-wheels. The centrally arranged pulley with the driving chain must be covered in all situations for reasons of safety.

BRIEF DESCRIPTION OF THE INVENTION

The present invention avoids the disadvantages of the prior art and provides a handrail-drive that offers safety for the drive, and allows the drive to be used with narrow profile balustrades, such as glass balustrades.

In accordance with the invention, an escalator or moving walk includes a handrail-drive which drives a reversing sheave peripherally, and preferably in the balustrade. A drive-wheel has a friction wheel or gear wheel that engages the handrail.

The advantages achieved by the invention are to be seen essentially in that in the case of escalators or moving walks with an elegant balustrade, the supporting structure, which takes the form of a truss, can be built narrowly. Furthermore, thanks to the handrail-drive acting directly on the reversing-wheel, guidance of the handrail can be simplified and reverse bending of the handrail minimized. Also advantageous is that the reversing zones can be built as narrow as the balustrades, and that the designer has more freedom in the design of the reversing zones. The width of the truss can be reduced, and the length of the handrail shortened. The handrail no longer crosses the step-chain. The handrail layshaft and chain lubrication equipment are obviated.

BRIEF DESCRIPTION OF THE DRAWINGS

The invention is explained in more detail by reference to the following preferred but, nonetheless, illustrative embodiments, as further set forth in the annexed drawings, wherein.

DETAILED DESCRIPTION OF THE INVENTION

Figure 1:
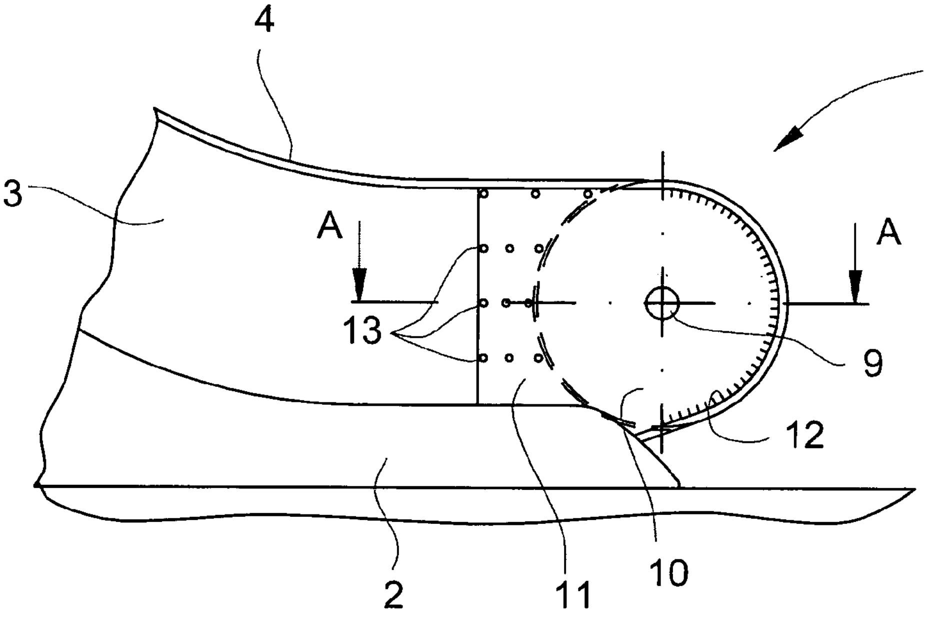
FIG. 1 is a side view of a reversing zone of an escalator employing the invention.

In FIGS. 1 to 10, 1 indicates a reversing zone of an escalator or moving walk, which essentially comprises a balustrade base 2, a balustrade 3, and a handrail 4. For the transportation of persons and objects, provided on an escalator are steps 5 or, on a moving walk, pallets 5, each of which extends on the cheek side to the balustrade base 2. The step-side or pallet-side of the balustrade 3 (the transporting side) is indicated by reference 6, and the outside of the balustrade 3 by reference 7.

On escalators and moving walks today, the balustrade 3 consists of, for example, glass with a wall thickness of about 10 mm, which gives the escalator or moving walk a slim, light, elegant appearance.

FIG. 1 shows a reversal of the direction of travel handrail 4 by means of a reversing sheave 10 which rotates about an axle 9 and is, for example, transparent, with a wall-thickness which is approximately the same as the wall-thickness of the balustrade 3. The axle 9 is connected by at least one, for example transparent, supporting cheek 11 which is connected, for example by means of a welded joint 12, to the supporting construction of the handrail 4 and/or, for example, by means of a screwed or riveted connection 13, to the balustrade 3.

Figure 2:
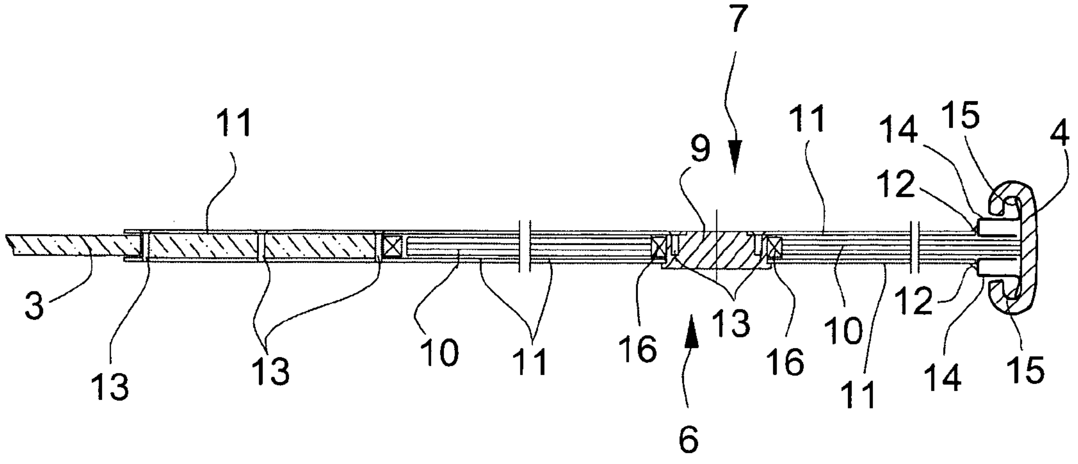
FIG. 2 is a cross-section view along line A—A of the reversing zone shown in FIG. 1.

FIG. 2 shows details of the reversal of the handrail 4. On the outside 7, the axle 9 is connected by means of, for example, a screwed or riveted connection 13 to the supporting cheek 11, which, as is the supporting cheek 11 of the transporting side 6, connected to a support 14 of the handrail construction by means of the welded joint 12. In the case of transparent supporting cheeks 11, in the peripheral zone of the reversing sheave 10 dark tinting can be provided. The supports 14, which are arranged on both sides of the reversing sheave 10, each have at one end a gliding surface 15 on which the surface of the handrail 4 glides and is guided. The handrail 4 is supported medially and reversed by the rotating reversing sheave 10. The reversing sheave 10 is held rotatably by means of a bearing 16 on the axle 9.

Figure 3:
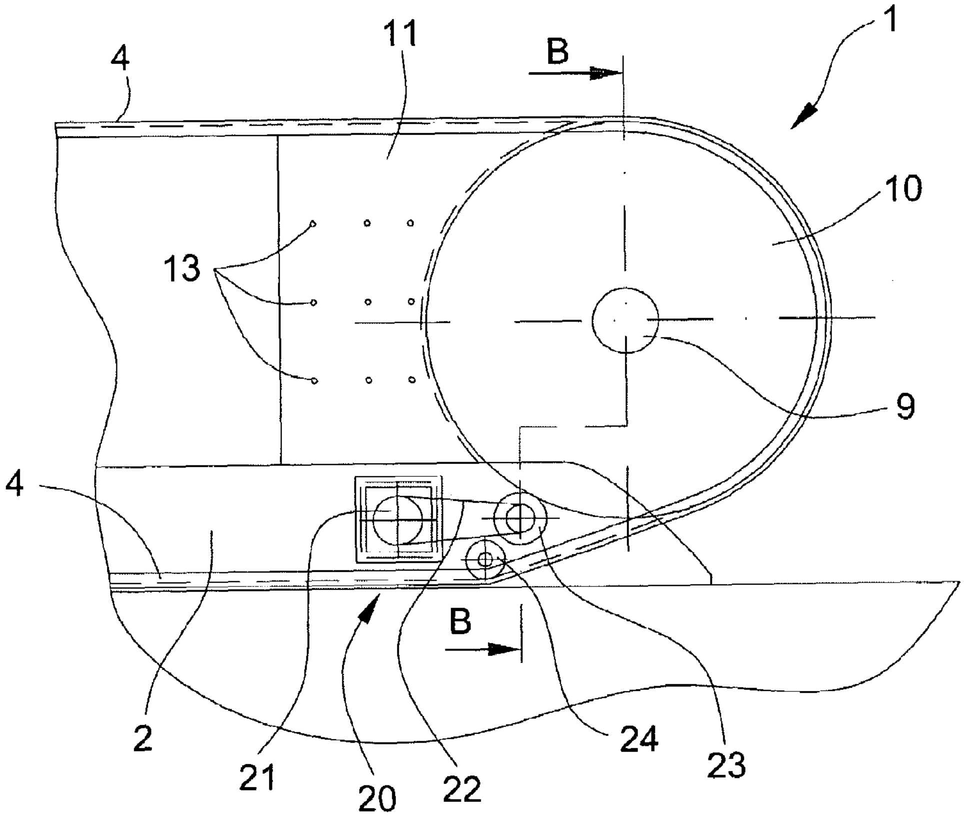
FIG. 3 is a side view of the reversing zone of the escalator showing the handrail-drive.

FIG. 3 shows the handrail-drive 20 which is integrated with the balustrade base 2 and consists of, for example, an electric motor 21 which, by means of a chain or belt 22 (toothed belt, V-belt, flat belt, studded belt), drives a drive-wheel 23. The reversing sheave 10 is driven peripherally by the drive-wheel 23. The handrail 4, which is guided over a diverter roller 24, is moved along with the reversing sheave 10 by means of friction. The electric motor 21 can be a torque motor, or synchronized with the step-chain 26.1 by means of a control circuit, or synchronized by means of a step-chain motor.

Figure 4:
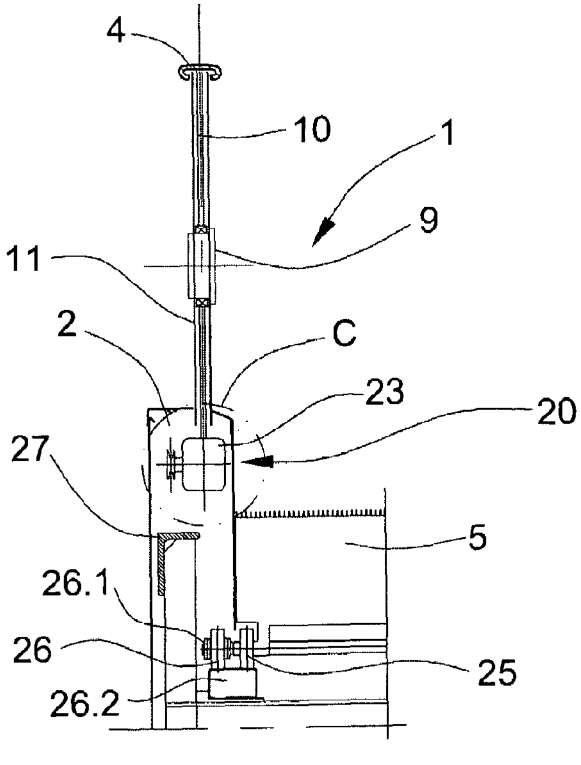
FIG. 4 is a cross-section view along line B—B of the reversing zone shown in FIG. 3.

The cross-section B—B shown in FIG. 4 illustrates the arrangement of the handrail-drive 20 in the balustrade base 2 and the peripheral drive at the edge of the reversing sheave 10 by means of the drive-wheel 23. Also, the step 5, which is connected to the step-chain 26.1 on both sides, is shown with idler wheels 25, 26 which roll on a guide 26.2 arranged on the truss 27.

Figure 5:
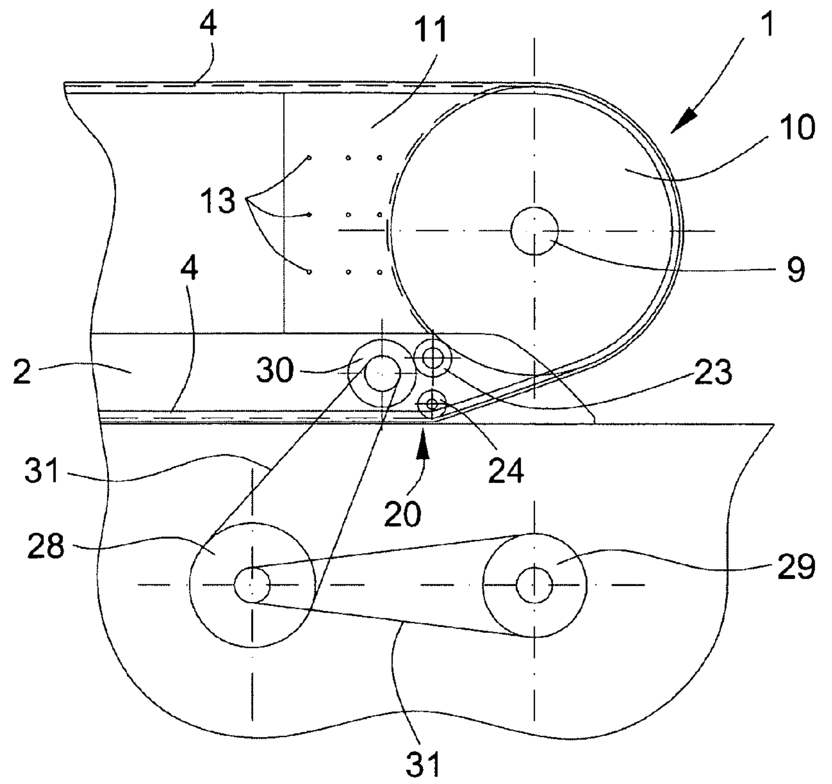
FIG. 5 is a side view of a first variant embodiment of the handrail drive of the invention utilizing a layshaft.
Figure 6:
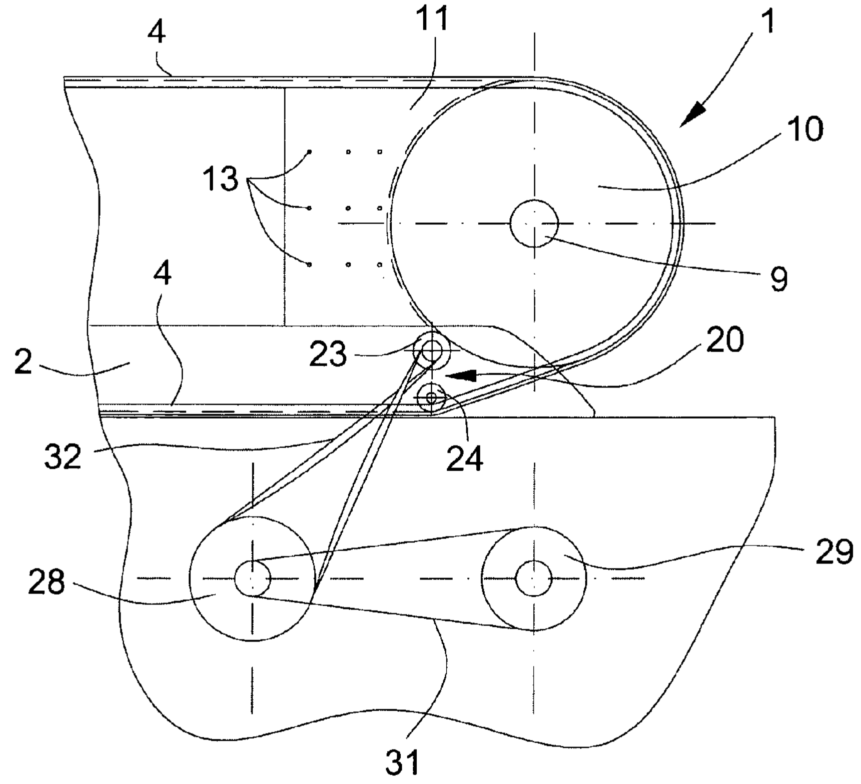
FIG. 6 is a side view of a second variant embodiment thereof.

FIGS. 5 and 6 show the handrail-drive 20 according to the invention with a layshaft 28, the layshaft 28 being drivable by means of a main shaft 29 which drives the step-chain. The transmission of force from shaft to shaft and from the layshaft 28 to a reduction wheel 30 takes place by means of chains or belts 31 (toothed belt, V-belt, flat belt, studded belt), the reduction wheel 30 driving the drive-wheel 23. FIG. 6 shows the handrail-drive 20 without a reduction wheel 30, the transmission of force from the layshaft 28 to the drive-wheel 23 taking place directly by means of crossed belts 32.

Figure 7:
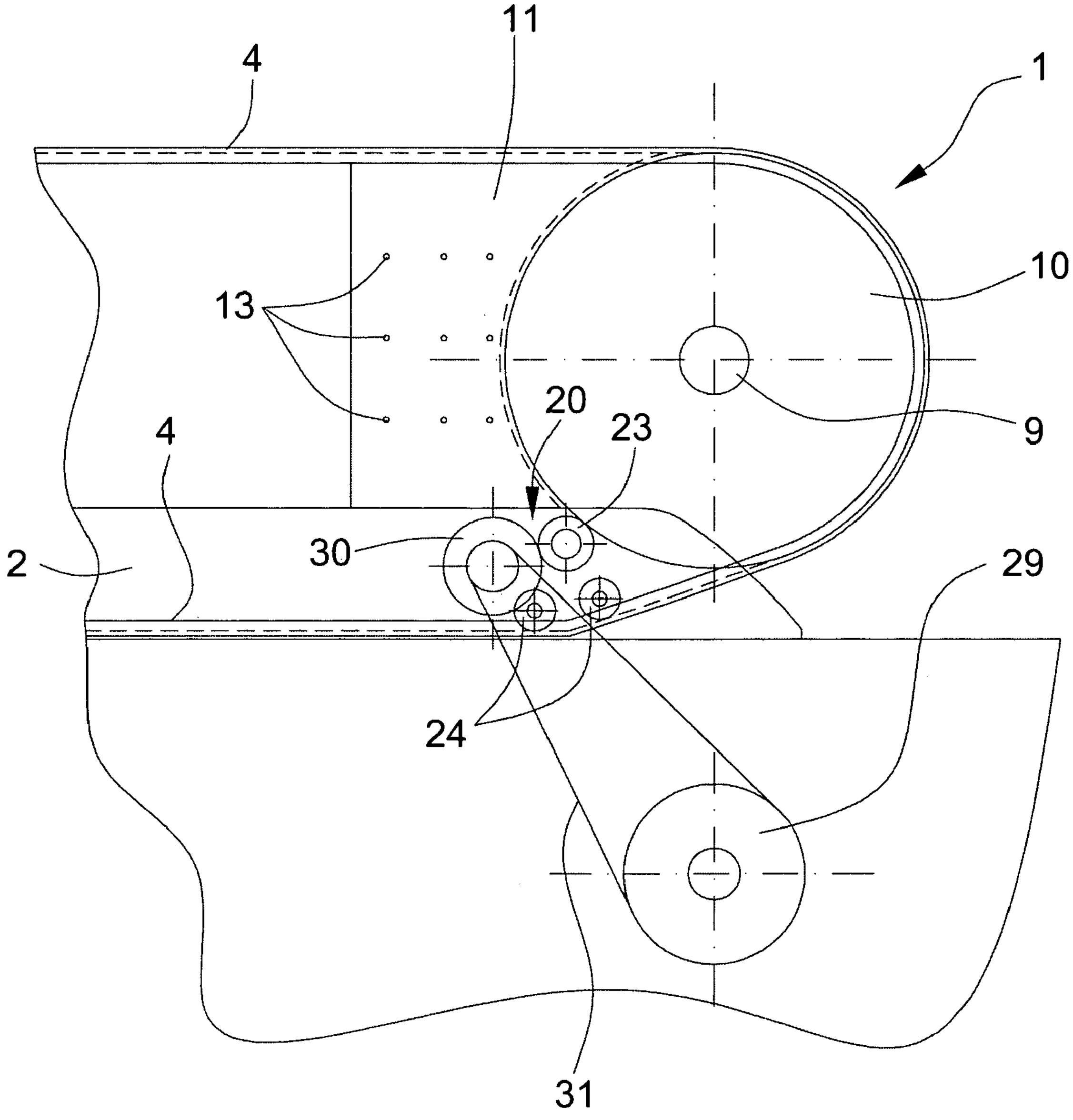
FIG. 7 is a third variant embodiment of the handrail drive of the invention, without a layshaft.

FIG. 7 shows a variant embodiment of the handrail drive 20 without a layshaft. In this variant, the reduction wheel 30 is driven directly by the main shaft 29 by chain or belt 31. Elimination of the layshaft 28 is a constructional advantage and reduces the number of components.

Figure 8:
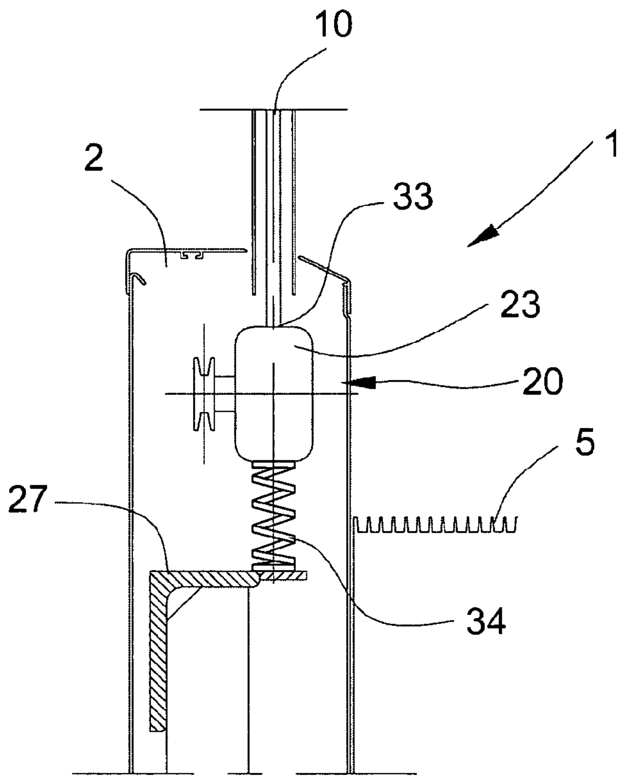
FIGS. 8, 9 and 10 each present an alternative construction for the engagement of the handrail drive and the handrail, as denoted at C of FIG. 4.
Figure 9:
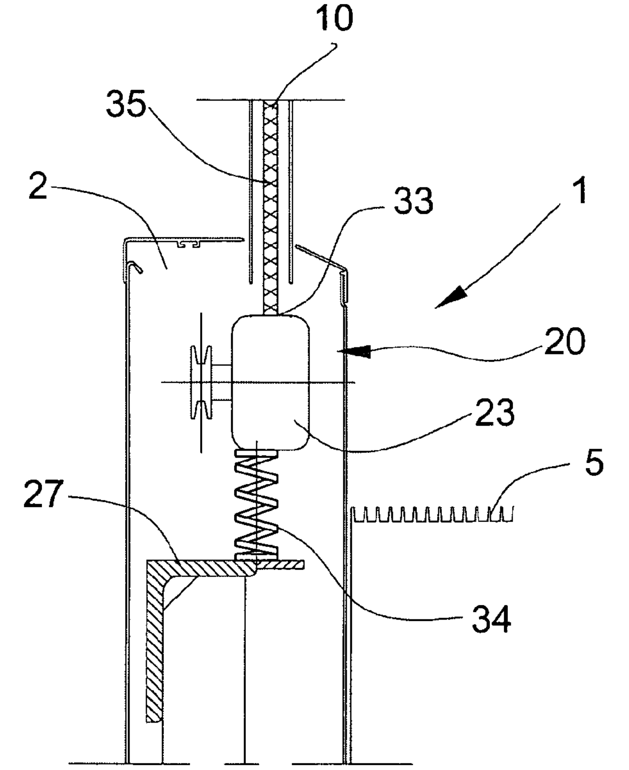
Figure 10:
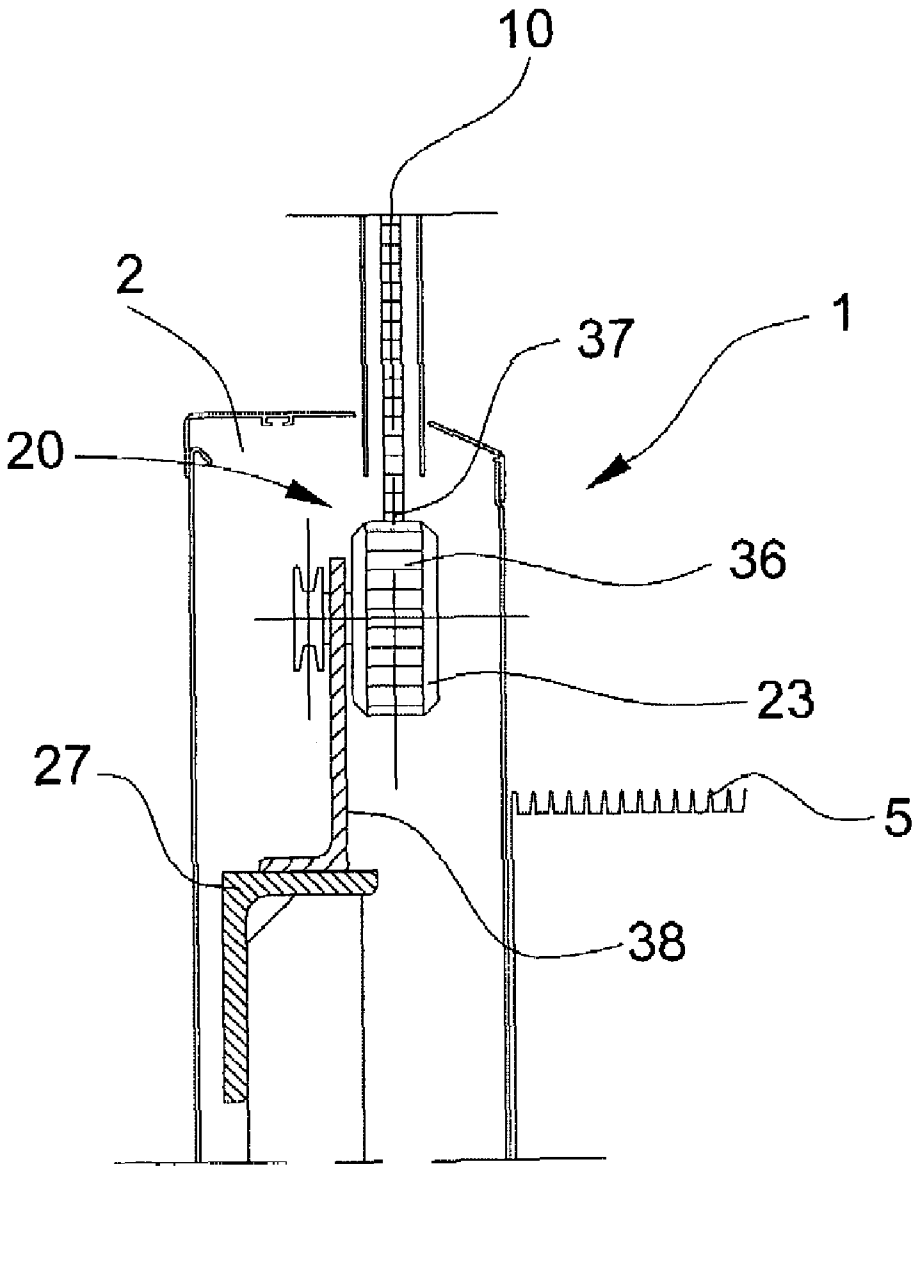

FIGS. 8, 9 and 10 show detail C of FIG. 4, which shows in more detail the drive-wheel 23 and the reversing sheave 10 for variants of possible frictional pairs and gearwheel pairs.

FIG. 8 shows a drive-wheel 23 with a smooth surface as a friction surface, by means of which the reversing sheave 10 can be driven. The drive-wheel 23 is, for example, arranged on a rocker-arm (not shown) which can have applied to it by means of a spring 34 a spring force, the drive-wheel 23 being thereby pressed against the reversing sheave 10. The necessary pressure on the friction contact point 33 is produced thereby. The reversing sheave 10, which may be made, for example, of plastic, aluminum, or safety glass, and the drive-wheel 23 which may be made, for example, of polyurethane, polyamide, or polyvinylidene fluoride, are matched to each other as friction partners, it being possible for the spring force of spring 34 to be, for example, increased or decreased pneumatically or hydraulically.

FIG. 9 shows the drive-wheel 23 with a smooth surface as the friction surface and the reversing sheave 10 with a milled, knurled, or cross-knurled surface 35 as its friction surface, the drive-wheel 23 being, for example, a rubberized roller of polyurethane and driving the slimly constructed and therefore extremely light reversing sheave 10 under spring-pressure loading. With this surface of the reversing sheave, friction at the friction contact point 33 is improved and reduces the danger of slipping.

FIG. 10 shows the drive-wheel 23 with spur toothing 36, the reversing sheave 10 also having spur toothing. The contact point 37 is on the gearwheel reference circle and is mechanically engaged. The gearwheels are provided with many small teeth because large teeth would cause damage to the handrail 4. The inside, or gliding, surface of the handrail 4 is hardly damaged by the small teeth on the large diameter of the reversing sheave 10. The drive of the handrail 4 takes place in a manner comparable to a multi-stage gearwheel gearbox, the handrail 4 being engaged with the last gearwheel. A fastening angle bracket 38, which is arranged on the truss 27, holds the drive-wheel 23 fixed at a certain distance from the reversing sheave 10, the distance being settable.

As set forth in the annexed claims, the term "escalator" is intended to mean and include a moving walk, and the term "steps" thereof is intended to mean and include pallets of a moving walk.

I claim:

1. An escalator, comprising a balustrade, a balustrade base, steps for the transportation of persons and objects, a handrail construction with a handrail arranged on the balustrade, the balustrade having a reversing zone wherein a direction of travel of the handrail is reversed by means of a drivable reversing sheave having a periphery in driving contact with the handrail, and a handrail-drive having means for driving the reversing sheave and comprising a drive-wheel in contact with the reversing sheave periphery.

2. The escalator according to claim 1, wherein the drive-wheel is a friction wheel or a gearwheel.

3. The escalator according to claim 2, wherein the handrail drive is arranged in the balustrade base and has a controllable motor as a drive for the drive-wheel.

4. The escalator according to claim 2, further comprising a driving main shaft coupled to the drive-wheel and to a step-chain.

5. The escalator according to claim 2, wherein the drive-wheel has a friction surface in a form of a smooth surface and the reversing sheave has a friction surface in a form of a knurled surface.

6. The escalator according to claim 2, wherein the drive-wheel has spur toothing for engaging the reversing sheave.

7. The escalator according to claim 1 or 2, further comprising supporting cheeks for the reversing sheave having dark tinting adjacent a peripheral zone of the reversing sheave.

* * * * *